United States Patent
Janus et al.

(10) Patent No.: US 7,345,689 B2
(45) Date of Patent: Mar. 18, 2008

(54) INTERFACING A DIGITAL DISPLAY CARD THROUGH PCI EXPRESS CONNECTOR

(75) Inventors: Scott R. Janus, Rocklin, CA (US); Katen A. Shah, Folsom, CA (US); Adam H. Wilen, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 10/742,216

(22) Filed: Dec. 19, 2003

(65) Prior Publication Data

US 2005/0134593 A1 Jun. 23, 2005

(51) Int. Cl.
*G06F 13/14* (2006.01)
*G06F 3/00* (2006.01)

(52) U.S. Cl. .................... 345/520; 345/519; 710/8

(58) Field of Classification Search ............... 345/520, 345/519, 501, 531, 530; 710/1, 8, 11, 15
See application file for complete search history.

(56) References Cited

U.S. PATENT DOCUMENTS

| | | | |
|---|---|---|---|
| 5,187,352 A * | 2/1993 | Blair et al. ............... 235/382 |
| 6,272,582 B1 * | 8/2001 | Streitenberger et al. .... 710/314 |
| 6,633,905 B1 * | 10/2003 | Anderson et al. .......... 709/219 |
| 6,734,862 B1 * | 5/2004 | Chapple et al. ............ 345/520 |
| 6,832,269 B2 * | 12/2004 | Huang et al. ................ 710/11 |
| 6,874,042 B2 * | 3/2005 | Sauber ........................ 710/38 |
| 2002/0194403 A1 * | 12/2002 | Pua et al. ..................... 710/62 |
| 2004/0153778 A1 * | 8/2004 | Cheng ......................... 714/25 |
| 2005/0083247 A1 * | 4/2005 | Juenger ...................... 345/2.2 |

OTHER PUBLICATIONS

"Video Graphics Array," http://en.wikipedia.org/wiki/VGA.*

* cited by examiner

*Primary Examiner*—Kee M. Tung
*Assistant Examiner*—Joni Hsu
(74) *Attorney, Agent, or Firm*—Blakely, Sokoloff, Taylor & Zafman LLP

(57) ABSTRACT

An embodiment of the present invention is a technique to interface a display card through an interface connector. A video output device on the display card generates digital video output signals from a graphics chipset on a motherboard. The card is plugged into an interface connector on the motherboard. The interface connector is compatible with a first interface standard. The video output device is compatible to a second interface standard. A card detector is coupled to the video output device and the interface connector to enable the video output device if the graphics chip set supports the video output device.

21 Claims, 3 Drawing Sheets

INTERFACING A DIGITAL DISPLAY CARD THROUGH PCI EXPRESS CONNECTOR

BACKGROUND

1. Field of the Invention

Embodiments of the invention relate to the field of computer systems, and more specifically, to display cards.

2. Description of Related Art

Peripheral Component Interconnect (PCI) Express Base has become increasingly popular in modern computer systems. The PCI Express Base is well suited for use in traditional personal computer (PC), laptop, notebook, mobile computers, and server architectures. Advantages of PCI Express architecture include low pin count, high speed, serial device-to-device interconnect. Therefore, for platforms using PCI Express, there is a need for new graphics capabilities. There is, however, no mechanism to make use of a digital display codec using the PCI Express connector. In a typical platform using the PCI Express, the Accelerated Graphics Port (AGP) model is no longer applicable.

Existing techniques to solve the above problem are inadequate. One technique is to place the display codec on the motherboard. This technique is expensive because the motherboards may have to include unnecessary circuitry or space for platforms that do not need a digital display. Furthermore, it creates many significant placement and routing issues in the motherboard design. Another technique is to provide the digital display codec device on the PCI Express card. However, this technique is not desirable because of the incompatibility between the clocking and transfer rates of the PCI Express and the digital codec device. The PCI Express is defined as a fixed frequency interface that requires significant amounts of logic and bandwidth overhead to handle building and decoding packets while digital displays need to have variable clocking and transfer rates and need very little overhead for the transfer of video data.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention is a technique to interface a display card through an interface connector. A video output device on the display card generates digital video output signals from a graphics chipset on a motherboard. The card is plugged into an interface connector on the motherboard. The interface connector is compatible with a first interface standard. The video output device is compatible with a second interface standard. A card detector is coupled to the video output device and the interface connector to enable the video output device if the graphics chip set supports the video output device.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
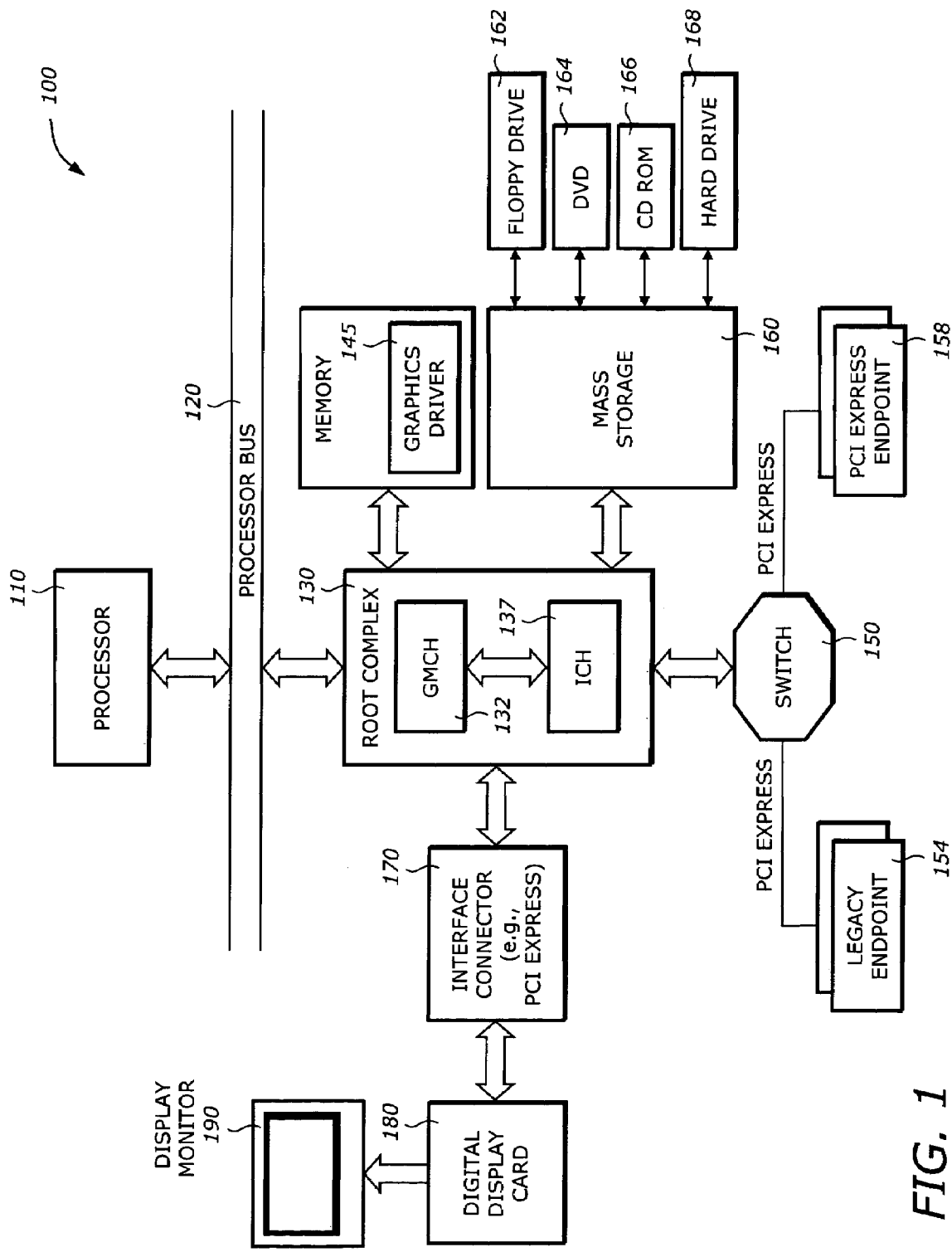
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a root complex 130, a system memory 140, a switch 150, a mass storage device 160, an interface connector 170, a digital display card 180, and a display monitor 190. Note that the system 100 may include more or fewer elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., the root complex 130. The processor bus 120 may support a uni-processor or multiprocessor configuration. The processor bus 120 may be parallel, sequential, pipelined, asynchronous, synchronous, or any combination thereof.

The root complex 130 is a root of an input/output (I/O) hierarchy that connects the processor 110 and/or the memory 140 to the I/O devices. The root complex 130 may support one or more interface ports such as Peripheral Component Interconnect (PCI) Express ports. Each interface defines a separate hierarchy domain. Each hierarchy domain may be composed of a single endpoint or a sub-hierarchy containing one or more switch components and endpoints. The root complex may include an integrated graphics memory controller hub (GMCH) chipset 132 and an I/O hub controller (ICH) chipset 137. The GMCH 132 provides control and configuration of memory, graphics, and input/output devices such as the system memory 140 and the ICH 127. The ICH 137 has a number of functionalities that are designed to support I/O functions. The ICH 137 may also be integrated into a chipset together or separate from the GMCH 132 to perform I/O functions. The ICH 137 may include a number of interface and I/O functions such as PCI bus interface, processor interface, interrupt controller, direct memory access (DMA) controller, power management logic, timer, system management bus (SMBus), universal serial bus (USB) interface, mass storage interface, low pin count (LPC) interface, etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a graphics driver 145. Any one of the elements of the graphics driver 145 may be implemented by hardware, software, firmware, microcode, or any combination thereof. The system memory 140 may also include other programs or data which are not shown, such as an operating system.

The switch 150 is a logical assembly of multiple virtual PCI-to-PCI bridge devices. It appears to the configuration software as two or more logical PCI-to-PCI bridges. The switch 150 provides PCI Express interface to legacy endpoints 154 and PCI Express endpoints 158. An endpoint is a type of device that can be a requester or completer of a PCI Express transaction.

The mass storage device 160 stores archive information such as code, programs, files, data, applications, and operating systems. The mass storage device 160 may include floppy drive 162, a digital video/versatile disc (DVD) 164, a compact disk (CD) Read Only Memory (ROM) 166, and a hard drive 168, and any other magnetic or optical storage device. The mass storage device 160 provides a mechanism to read machine-accessible media. The machine-accessible media may contain computer readable program code to perform tasks as described below.

The interface connector 170 is a connector attached to the motherboard that contains the processor 110, the root complex 130, the memory 140, and other devices. The interface connector 170 is compatible with an interface standard. In one embodiment, the interface standard is the PCI Express as described in the PCI Express Base Specification Revision 1.0 and PCI Express Card Electromechanical Specification Revision 1.0, both published by the PCI Special Interest Group (PCI-SIG), dated Jul. 22, 2002.

The digital display card 180 contains circuitry and/or devices that provide display signals to drive the display monitor 190. The digital display card 180 is plugged into the interface connector 170 to interact with the GMCH 132 in the root complex 130. In one embodiment, the digital display card 180 is compatible with a suitable serial digital video output (SDVO) display format. It contains an SDVO device that generates the digital display signals. In one embodiment, the digital display card 180 may be referred to as an Accelerated Graphics Port (AGP) Digital Display second generation (ADD2).

The display monitor 190 is a monitor that may be analog or digital. It may be a flat panel display such as Liquid Crystal Display (LCD), electroluminescent display (ELD), gas-plasma display, or a Cathode Ray Tube (CRT) display, or a television (TV) set.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. A flowchart may also describe an iteration in a loop.

One embodiment of the invention is a technique to provide an add-on card to be plugged into a PCI Express connector on, a motherboard and provide SDVO functionalities. The add-on card does not contain a PCI Express-compatible device. It contains a SDVO-compatible device that can generate digital display signals to drive a display monitor. The motherboard typically contains a graphics chipset that supports SDVO. If the add-on card is plugged into a motherboard that supports either PCI Express or SDVO through the interface connector, the add-on card can be used as a digital display path upgrade. If the motherboard only supports the PCI Express but not the SDVO standard, the card is neither harmed nor causes harm to other devices or the system. The PCI Express provides independent low speed and low pin count digital interface via the control bus to communicate with devices on the add-on card.

The graphics chipset is typically an integrated Graphics Memory Controller Hub (GMCH) chipset that may support one or more SDVO ports. The multiplexed bus signals from the GMCH come across the high speed digital interface to the interface connector to support the add-on card in either PCI Express mode or SDVO mode. There is a card sense signal using pull-up/down strapping at a strapping point on the interface connector 170. The strapping is used to differentiate between a SDVO compatible card and a PCI Express compatible card. The GMCH has two circuit components: an SDVO circuitry and a PCI Express circuitry. If the strapping is at a $V_{STRAP}$ level (e.g., HIGH), the GMCH disables its PCI Express circuitry and enables its SDVO circuitry to communicate with the add-on card having an SDVO device. If the strapping is not at a $V_{STRAP}$ level (e.g., LOW), the GMCH disables its SDVO circuitry and enables its PCI Express circuitry to communicate with the add-on card having a PCI Express device. The add-on card described as one embodiment of the invention provides digital display codec devices compatible with the SDVO signaling and external/internal display interconnections such as CRT, TV, high definition television (HDTV), digital visual interface (DVI), etc. To provide support for the add-on card, there is graphics controller software including the video basic input/output system (BIOS) and/or graphics device drivers such as the graphics driver 145.

Figure 2:
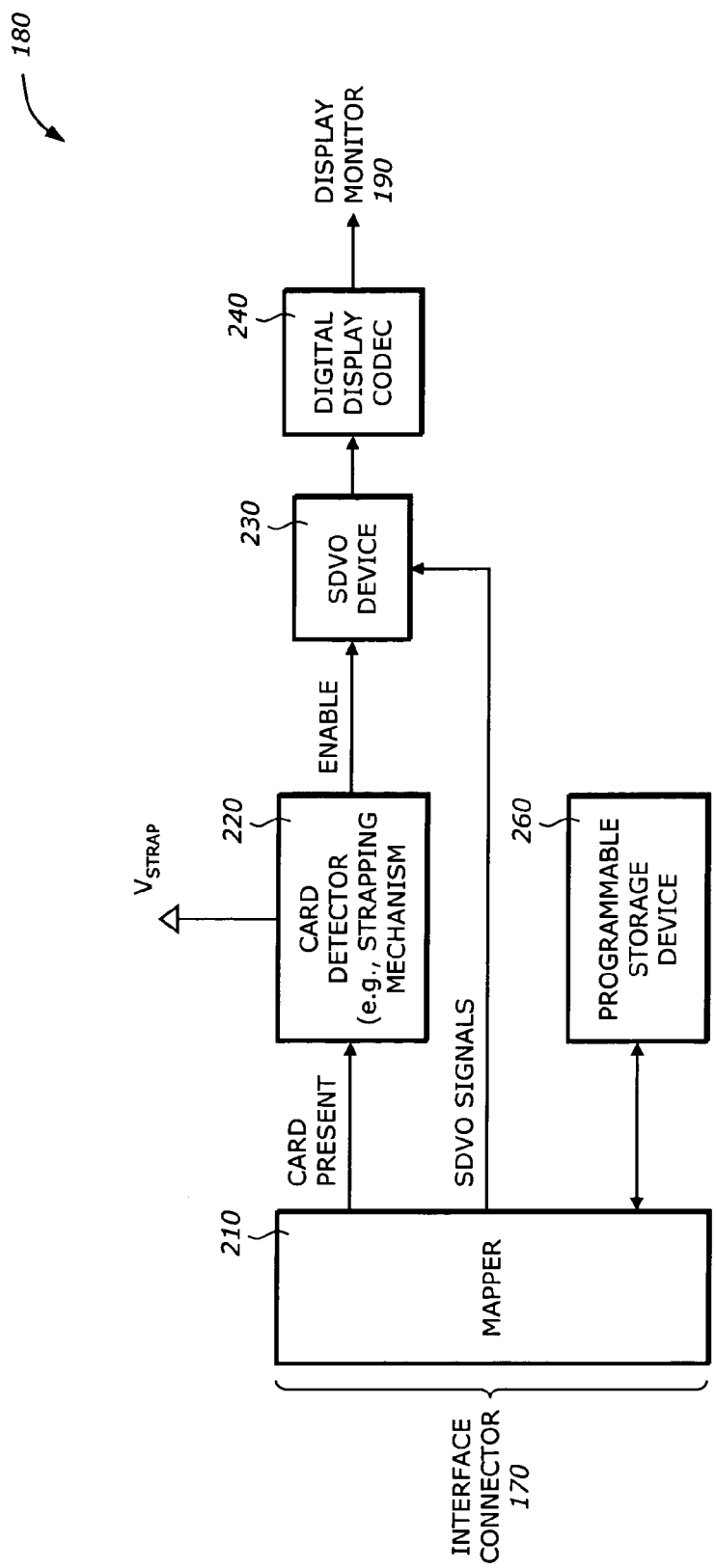
FIG. 2 is a diagram illustrating a digital display card according to one embodiment of the invention.

FIG. 2 is a diagram illustrating the digital display card 180 according to one embodiment of the invention. The digital display card 180 includes an interface mapper 210, a card detector 220, an SDVO device 230, a digital display codec 240, and a programmable storage device 260. Note that the digital display card 180 may contain more or less than the above elements.

The interface mapper 210 maps or translates the interface connector functions into the SDVO functions. It may use a fixed or static mapping or a dynamic mapping. A fixed or static mapping refers to a pre-configured mapping such as hardwired or pin assignments. A dynamic mapping refers to a configurable or programmable mapping that uses programmable switches to connect the pins on the interface connector 170 to pins or signal points on the card 180. By using the interface mapper 210, the digital display card 180 may be plugged into the interface connector 170 that is compatible with one interface standard (e.g., the PCI Express standard) but provides functionality of another interface standard (e.g., SDVO standard).

The card detector 220 detects the presence of the card and enables the SDVO device 230 when the graphics chipset in the root complex 130 supports the SDVO device 230. The enable signal may be gated or used to decode the signals from interface mapper 210 to enable the SDVO device 230 and other devices that are related to the SDVO interface on the card. In one embodiment, the card detector 220 includes a strapping mechanism that pulls a strapping point to a logic level indicated by $V_{STRAP}$. The strapping point may be a pre-defined pin on the interface connector 170. The logic level may be LOW or HIGH depending on the configuration. In one embodiment the $V_{STRAP}$ level is HIGH. In one embodiment, the strapping point is not pulled to the $V_{STRAP}$ level by other cards that contain PCI Express devices or are intended for PCI Express functions. Therefore, when the card 180 is plugged into the connector 170 pulling the strapping point to $V_{STRAP}$, the GMCH 132 (FIG. 1) disables its PCI Express function and enables its SDVO function so that its SDVO circuitry may communicate with the card 180. By having this strapping mechanism, the card 180 may be plugged into the interface connector compatible with a first standard (e.g., the PCI Express) to provide the functionalities compatible with a second standard (e.g., the SDVO) that is different than the first standard.

The SDVO device 230 is a device that is compatible with the SDVO interface standard or format. The SDVO is the serial version of the DVO. The SDVO device 230 receives or transmits signals from and to the interface mapper 210 which are physically and electrically compatible with the PCI Express standard and functionally compatible with the SDVO standard. The SDVO device 230 then generates digital display signals that are used to drive the display monitor 190.

The digital display codec 240 is a device that encodes and/or decodes the digital display signals generated by the SDVO device 230 into a usable video signal to drive the display monitor 190. The video signal may be compatible with any one of transition minimized differential signal (TMDS) or low voltage differential signaling (LVDS) devices. National Television System Committee (NTSC) format, a phase alternation by line (PAL) format, a sequential technique and memory storage (SECAM) format, and a high definition television (HDTV) format. Note that these are only some examples of various display devices. Any other display modes or devices may be used.

The programmable storage device 260 is any suitable storage device such as random access memory, erasable programmable read-only memory, or flash memory to store code or data that may be used by the on-card devices or the GMCH on the motherboard. The programmable storage device 260 may be mapped at a fixed address or at an offset location with respect to some fixed address.

Figure 3:
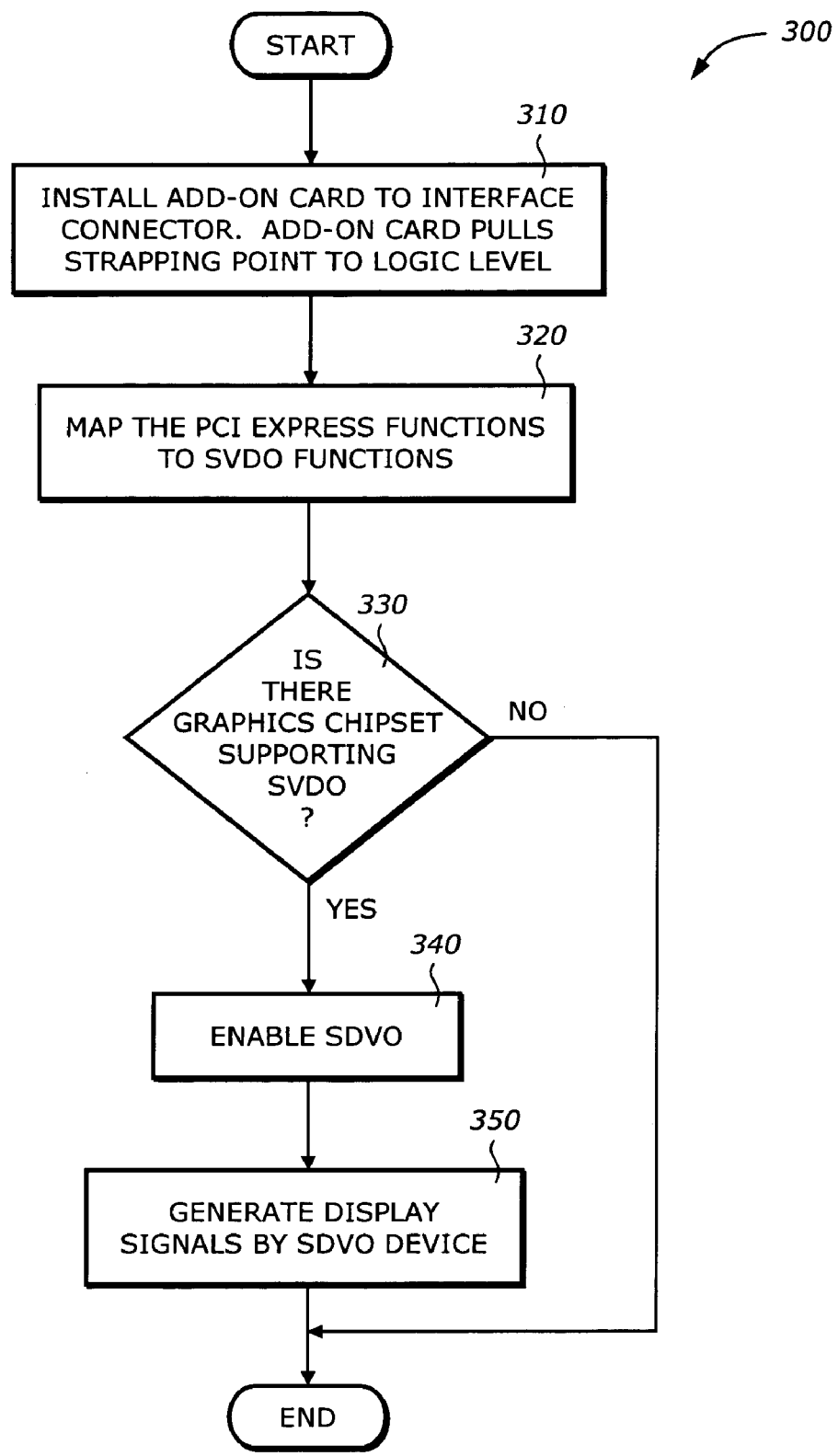
FIG. 3 is a flowchart illustrating a process to interface to the digital display card according to one embodiment of the invention.

FIG. 3 is a flowchart illustrating a process 300 to interface to the digital display card according to one embodiment of the invention.

Upon START, the process 300 installs an add-on card to the interface connector attached to the motherboard (Block 310). In one embodiment, the interface connector is compatible with the PCI Express standard. Then, the process 300 maps the PCI Express functions to the SDVO functions at the interface connector (Block 320). The mapping is a pin assignment performed by a fixed or dynamic mechanism.

Next, the process 300 determines if there is a graphics chipset supporting the serial DVO standard (Block 320). This determination can be made by having the graphics chipset generates control signals to the interface connector.

If there is no graphics chipset that supports the SDVO standard, the process 300 is terminated. Otherwise, the process 300 enables an SDVO device on the add-on card (Block 330). This enabling can be made by strapping a strapping point on the interface connector to a pre-defined logic level. The strapping can be performed by pulling up or down the strapping point to HIGH or LOW, respectively. Then, the process 300 generates the digital display output signals using the SDVO device (Block 350) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a video output device on a card to generate digital video output signals from a graphics chipset on a motherboard, the card being plugged into an interface connector on the motherboard, the interface connector being compatible with a first interface standard, the video output device being compatible to a second interface standard; and
    a card detector coupled to the video output device and the interface connector to enable the video output device if the graphics chipset supports the video output device.

2. The apparatus of claim 1 wherein the card detector comprises:
    a strapping mechanism to pull a strapping point to a logic level when the graphics chipset is present on the motherboard.

3. The apparatus of claim 1 further comprising:
    a digital display device compatible with the video output device to drive a display monitor using the digital video output signals.

4. The apparatus of claim 1 wherein the first interface standard is compatible with a peripheral component interconnect (PCI) Express standard.

5. The apparatus of claim 1 wherein the second interface standard is compatible with a serial digital video output (SDVO) standard.

6. The apparatus of claim 1 wherein the graphics chipset is an integrated graphics memory controller hub (GMCH) chipset.

7. The apparatus of claim 3 wherein the digital display device is a digital display codec device supporting at least one of a National Television System Committee (NTSC) format, a phase alternation by line (PAL) format, a sequential technique and memory storage (SECAM) format, and a high definition television (HDTV) format, a transmission minimized differential signal (TMDS), and a low voltage differential signaling (LVDS) device.

8. A method comprising:
    generating digital video output signals from a graphics chipset on a motherboard using a video output device on a card, the card being plugged into an interface connector on the motherboard, the interface connector being compatible with a first interface standard, the video output device being compatible to a second interface standard; and
    enabling the video output device by a card detector if the graphics chip set supports the video output device.

9. The method of claim 8 wherein enabling comprises:
    pulling a strapping point to a logic level by a strapping mechanism when the graphics chipset is present on the motherboard.

10. The method of claim 8 further comprising:
    driving a display monitor using the digital video output signals by a digital display device compatible with the video output device.

11. The method of claim 8 wherein the first interface standard is compatible with a peripheral component interconnect (PCI) Express standard.

12. The method of claim 8 wherein the second interface standard is compatible with a serial digital video output (SDVO) standard.

13. The method of claim 8 wherein the graphics chipset is an integrated graphics memory controller hub (GMCH) chipset.

14. The method of claim 10 wherein the digital display device is one of a digital display codec device supporting at least one of a National Television System Committee (NTSC) format, a phase alternation by line (PAL) format, a sequential technique and memory storage (SECAM) format, and a high definition television (HDTV) format, a transmission minimized differential signal (TMDS), and a low voltage differential signaling (LVDS) device.

15. A system comprising:
a graphics chipset on a motherboard;
an interface connector attached to the motherboard and compatible with a first interface standard; and
a card plugged into the interface connector to drive a display monitor, the card comprising:
  a video output device to generate digital video output signals from the graphics chipset, the video output device being compatible to a second interface standard, and
  a card detector coupled to the video output device and the interface connector to enable the video output device if the graphics chipset supports the video output device.

16. The system of claim 15 wherein the card detector comprises:
a strapping mechanism to pull a strapping point to a logic level when the graphics chipset is present on the motherboard.

17. The system of claim 15 wherein the card further comprises:
a digital display device compatible with the video output device to drive a display monitor using the digital video output signals.

18. The system of claim 15 wherein the first interface standard is compatible with a peripheral component interconnect (PCI) Express standard.

19. The system of claim 15 wherein the second interface standard is compatible with a serial digital video output (SDVO) standard.

20. The system of claim 15 wherein the graphics chipset is an integrated graphics memory controller hub (GMCH) chipset.

21. The system of claim 18 wherein the digital display device is a digital display codec device supporting at least one of a National Television System Committee (NTSC) format, a phase alternation by line (PAL) format, a sequential technique and memory storage (SECAM) format, and a high definition television (HDTV) format, a transmission minimized differential signal (TMDS), and a low voltage differential signaling (LVDS) device.

* * * * *